(12) United States Patent
Busse et al.

(10) Patent No.: US 8,043,110 B2
(45) Date of Patent: Oct. 25, 2011

(54) PLUG-IN CONNECTOR FOR PRINTED CIRCUITS

(75) Inventors: Ralf-Dieter Busse, Waldesruh (DE); Manfred Muller, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 12/760,057

(22) Filed: Apr. 14, 2010

(65) Prior Publication Data

US 2011/0034065 A1 Feb. 10, 2011

Related U.S. Application Data

(63) Continuation of application No. 11/547,453, filed as application No. PCT/EP2005/002968 on Mar. 19, 2005, now Pat. No. 7,717,732.

(30) Foreign Application Priority Data

Apr. 7, 2004 (DE) .......................... 10 2004 017 605

(51) Int. Cl.
*H01R 4/24* (2006.01)

(52) U.S. Cl. ...................................................... 439/404

(58) Field of Classification Search .................. 439/404, 439/405, 709, 912, 922, 402, 403, 710–712, 439/715–719, 723, 724
See application file for complete search history.

(56) References Cited

U.S. PATENT DOCUMENTS

| 4,561,712 | A |   | 12/1985 | Borne et al. |
| 5,114,356 | A | * | 5/1992 | Taybl et al. ................... 439/713 |
| 5,163,855 | A | * | 11/1992 | Gerke et al. ................... 439/709 |
| 5,297,970 | A |   | 3/1994 | Carney |
| 5,494,461 | A |   | 2/1996 | Bippus et al. |
| 5,575,689 | A | * | 11/1996 | Baggett et al. ................ 439/709 |
| 5,722,850 | A |   | 3/1998 | White |
| 6,068,503 | A |   | 5/2000 | Gerke et al. |
| 7,270,551 | B2 |  | 9/2007 | Busse et al. |
| 2003/0156389 | A1 |  | 8/2003 | Busse et al. |

FOREIGN PATENT DOCUMENTS

| DE | 38 06 263 A1 | 8/1989 |
| DE | 38 28 904 A1 | 3/1990 |
| DE | 9400303 | 1/1994 |
| DE | 196 52 422 C1 | 4/1998 |
| DE | 197 43 329 A1 | 4/1999 |
| DE | 199 45 412 A1 | 3/2000 |
| DE | 100 29 649 A1 | 1/2002 |
| DE | 101 11 571 A1 | 10/2002 |
| EP | 0 777 298 A2 | 6/1997 |
| EP | 1 286 420 A2 | 2/2003 |

* cited by examiner

*Primary Examiner* — Edwin A. Leon
(74) *Attorney, Agent, or Firm* — Merchant & Gould P.C.

(57) ABSTRACT

A plug connector for printed circuit boards includes a number of contact elements positioned in a housing. The contact elements each have two connection ends and an intermediate contact positioned between the two ends, where one connection end is in the form of an insulation displacement contact for connecting wires. The insulation displacement contacts are supported on the housing, so that the contact elements are held captively in the housing when connection forces act on the insulation displacement contacts.

13 Claims, 5 Drawing Sheets

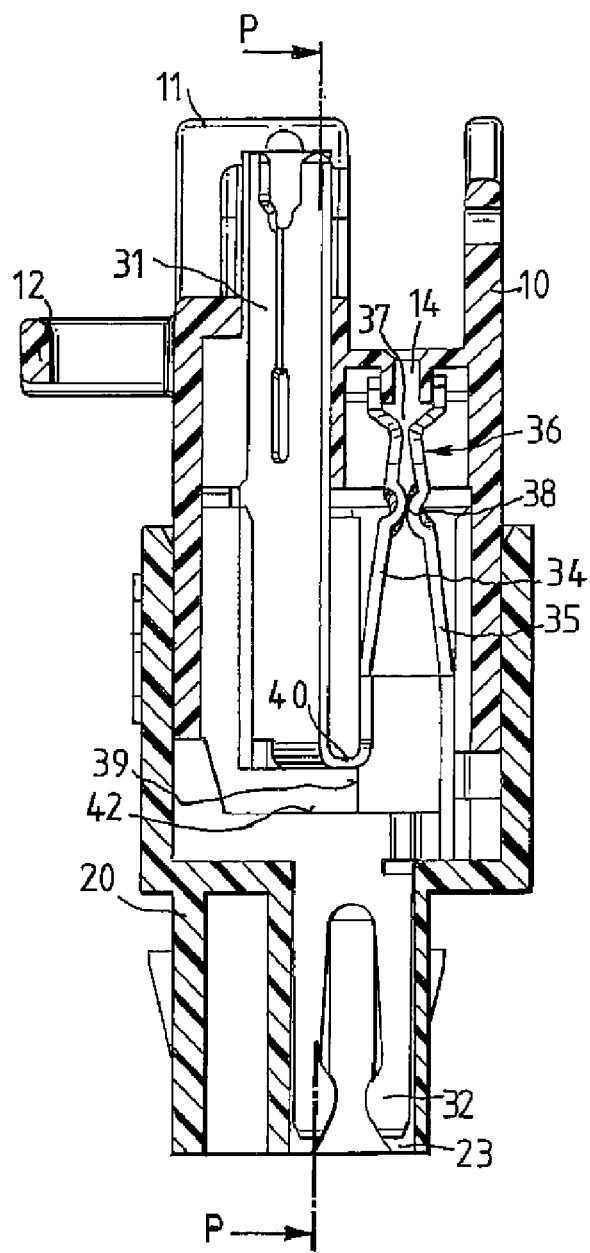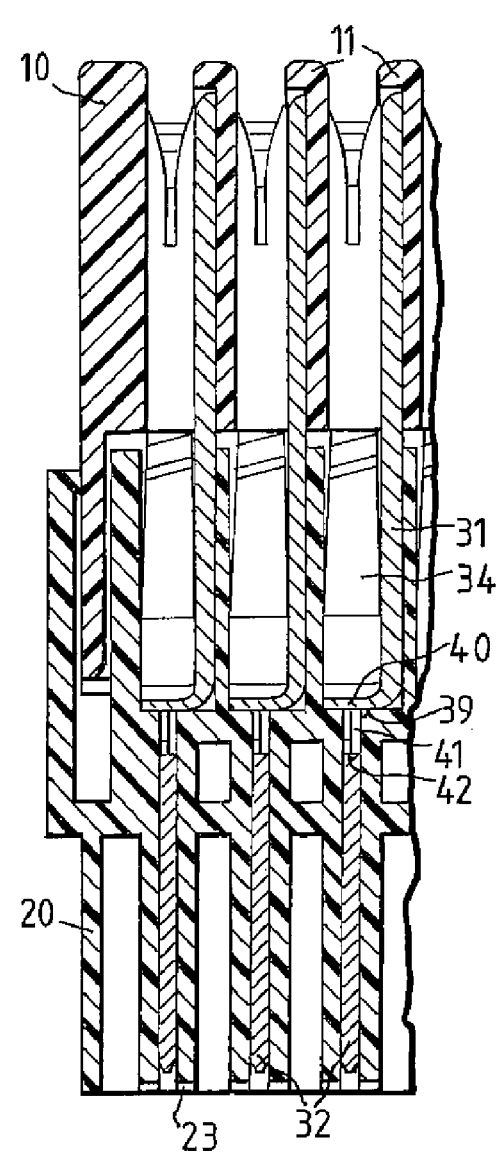

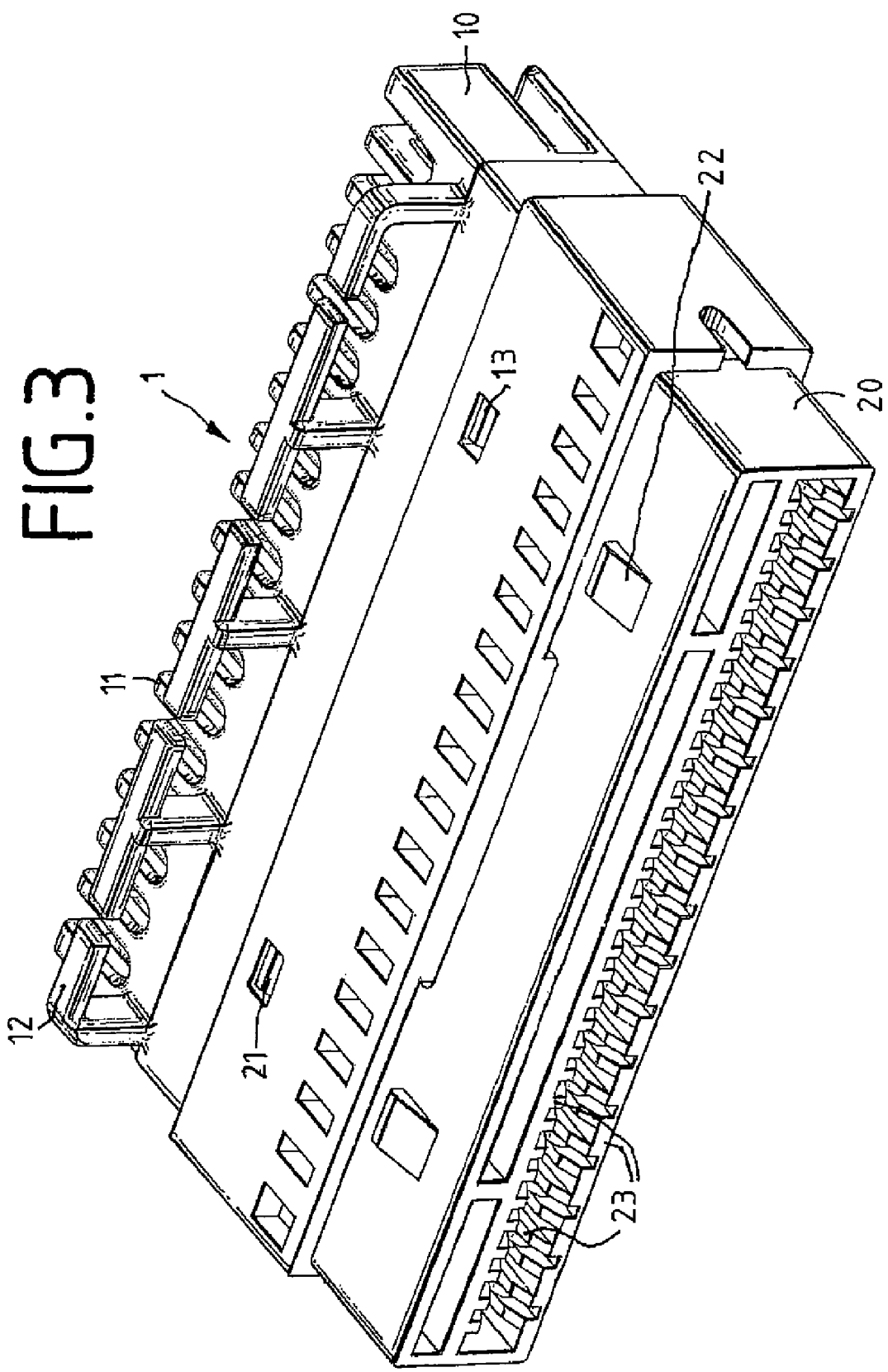

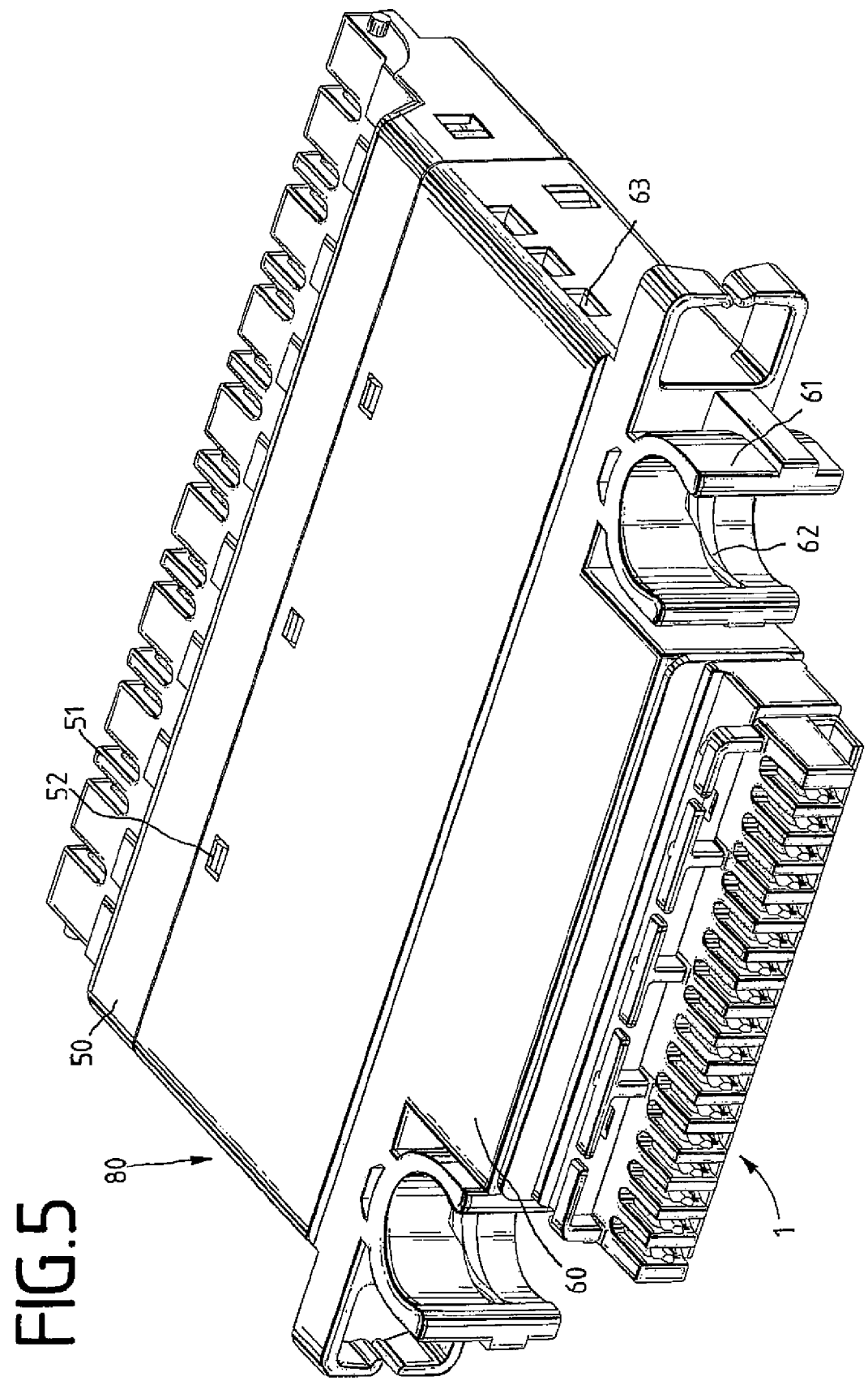

PLUG-IN CONNECTOR FOR PRINTED CIRCUITS

This application is a Continuation of U.S. Ser. No. 11/547,453, filed Sep. 18, 2008, now U.S. Pat. No. 7,717,732, which is a National Stage Application of PCT/EP2005/002968 filed 19 Mar. 2005, which claims benefit of Serial No. 10 2004 017 605.1, filed 7 Apr. 2004 in Germany and which applications are incorporated herein by reference. To the extent appropriate, a claim of priority is made to each of the above disclosed applications.

FIELD

The invention relates to a plug connector for printed circuit boards and also to a distributor connection module produced therewith.

BACKGROUND

DE 38 28 904 C2 discloses a plug connector for printed circuit boards, comprising contact elements which are electrically conductively connected to the conductor tracks on the printed circuit board and comprising a plug socket which is provided with mating contacts, where the contact elements are in the form of electrically conductive flat metal strips which are provided with angled strip portions to pass through receiving openings produced on the printed circuit board, are used to make contact with one of the conductor tracks, are electrically conductively connected to the conductor tracks and are fitted on an edge region of the printed circuit board, where the plug socket is provided with a receiving opening for the purpose of plugging it onto the edge region of the printed circuit board and with the mating contacts for the purpose of making contact with the metal strips, each metal strip having two angled resilient strip portions, provided with longitudinal slots and with lateral latching lugs for engaging behind the printed circuit board, for the purpose of putting it through and latching it into two passage holes which have been made in the region of the conductor track of the printed circuit board and serve as receiving openings. The drawback of the known plug connector is the relative complexity of making contact with the printed circuit board.

DE 100 29 649 C2 discloses a distributor connection module for telecommunications and data technology, comprising a housing in which input and output contacts for connecting lines or wires are arranged such that they are externally accessible, where the housing is designed to have a cavity which contains a printed circuit board having functional elements which is supported in the housing, the functional elements being arranged electrically between the input and output contacts, and the input contacts and the output contacts being arranged on opposite end faces of the housing. In this arrangement, the input and output contacts may be in the form of insulation displacement contacts which are each designed to have a fork-like contact which can be used to produce a force-fitting electrical connection for the functional elements. The printed circuit board has contact pads which are preferably on the top and bottom of the printed circuit board. These force-fitting connections are much more tolerant to production and assembly tolerances than solder connections. This means that contact can be made simultaneously with all of the insulation displacement contacts by latching the fork-like contacts onto the contact pads. In addition, this type of contact allows simple disassembly, for example if it is necessary to replace a faulty printed circuit board. To produce the distributor connection module, the printed circuit board with the functional elements is pushed into a first housing portion, and a second housing portion, carrying the input contacts, is latched on. To this end, the insulation displacement contacts are fixed to the housing, whereas the tuning fork contacts are free. Since large forces may arise when the insulation displacement contacts are subsequently connected up, it is additionally possible to latch a plastic-like retaining or support element onto the printed circuit board over the entire width of the printed circuit board, which fixes the fork-like contacts on the printed circuit board.

In addition, the printed document discloses the practice of arranging a respective externally accessible isolating contact between an input contact and an output contact, the isolating contact being arranged on the bottom of the printed circuit board. This results in a relatively complex assembly operation, since the isolating contacts need to be clamped between the printed circuit board and the housing.

DE 101 11 571 A1 discloses an electrical contact element for a plug connector arrangement. The contact element has an insulation displacement region at one end and a tuning fork contact at the other end. To increase the elasticity of the tuning fork contact, the contact-making arms are connected directly to the lower region of a lateral connecting piece of the double insulation piercing connecting devices and are then bent at an angle toward the center of the contact element, so that an extended spring movement results.

DE 38 06 263 A1 and DE 199 45 412 A1 each disclose a plug connector for printed circuit boards, comprising a number of contact elements, where the contact elements each have two connection ends, where one connection end is in the form of an insulation displacement contact for connecting wires and the other connection end is in the form of a tuning fork contact for making contact with pads on a printed circuit board, and a plastic housing into which the insulation displacement contacts of the contact elements can be inserted, where the insulation displacement contact and the tuning fork contact are arranged so as to be twisted with respect to one another and at least one lower edge of the insulation displacement contact is supported on the plastic housing, so that the contact elements are held captively in the plastic housing when connection forces act on the insulation displacement contacts, the plastic housing comprising at least one chamber-like region, and the tuning fork contacts being fully accommodated in the longitudinal direction by the plastic housing.

SUMMARY

Against the background of this known prior art, the invention is based on the technical problem of providing a plug connector which can be used to construct a distributor connection module having isolating contacts which is easier to manufacture from a production point of view and also of providing an associated distributor connection module.

In this regard, the contact element is of two-part design, with a first portion of the contact element comprising the insulation displacement contact and the second portion comprising the tuning fork contact, a respective contact limb being arranged on the two portions of the contact element, with the two contact limbs forming an isolating contact in the assembled state. As a result, the isolating contact is integrated into the plug connector. This simplifies the assembly operation for a distributor connection module considerably, since only the assembled plug connector needs to be pushed onto the printed circuit board. Separate assembly of the isolating contacts is not necessary, since they are formed automatically when the plug connector is assembled. In addition, the plug connector can be fitted with cable wires even before it is pushed onto the printed circuit board, since the insulation displacement contacts are supported in the housing and can thus absorb the connection forces.

In this case, the isolating contact is preferably in a form such that it can be accessed from the same end as the insulation displacement contacts. For this purpose, the contact limb on the first portion of the lower edge of the insulation displacement contact is bent upward in the direction of the insulation displacement contact, whereas the contact limb of the second portion runs in the opposite direction to the tuning fork contact.

In one preferred embodiment, the contact limbs are in a form such that they form a contact region and an insertion region, with the insertion of an isolating connector into the insertion region moving the contact limbs in the contact region away from one another, the isolating connector not touching the contact region. This ensures that wear on the usually plastic isolating connector does not soil the contact region, which would reduce the contact quality.

In another preferred embodiment, the inner sides of the chamber-like region have ribs arranged on them which define guides for the tuning fork contacts, the contact regions of the tuning fork contacts protruding beyond the ribs. In this arrangement, the tuning fork contacts are fully accommodated in the longitudinal direction by the plastic housing. As a result, all tuning fork contacts are oriented in a defined manner with respect to one another and can be pushed onto the printed circuit board more easily, since there is no possibility of the tuning fork contacts canting.

In another preferred embodiment, the ribs are beveled in the front region, which simplifies the plugging operation.

In another preferred embodiment, the insulation displacement contact and the tuning fork contact are arranged so as to be twisted with respect to one another in the region of 45° with respect to one another.

In another preferred embodiment, the plastic housing is of two-part design, with the housing portions being able to be latched to one another. One advantage of the two-part housing is the ease of disassembly, which means that plastic and metal parts can very easily be removed for recycling purposes. Assembly is a very simple matter involving the first housing portion being fitted with the first portion of the contact element, and the second housing portion being fitted with the second portion of the contact element, and the two housing portions then being latched to one another.

In another preferred embodiment, the plug connector is produced with wire routing eyes.

In another preferred embodiment, the outer side of the plug connector has latch elements arranged on it which can be used to latch the plug connector to a further housing which accommodates a printed circuit board.

BRIEF DESCRIPTION OF THE DRAWINGS

The invention is explained in more detail below with reference to a preferred exemplary embodiment. In the figures:

FIG. 2a shows a cross section through the assembled plug connector, the section being taken between two clamping bars, FIG. 2b shows a cross section along the sectional line P-P, FIG. 3 shows a perspective rear view of the plug connector, FIG. 5 shows a perspective illustration of the assembled distributor connection module.

DETAILED DESCRIPTION

Figure 1:
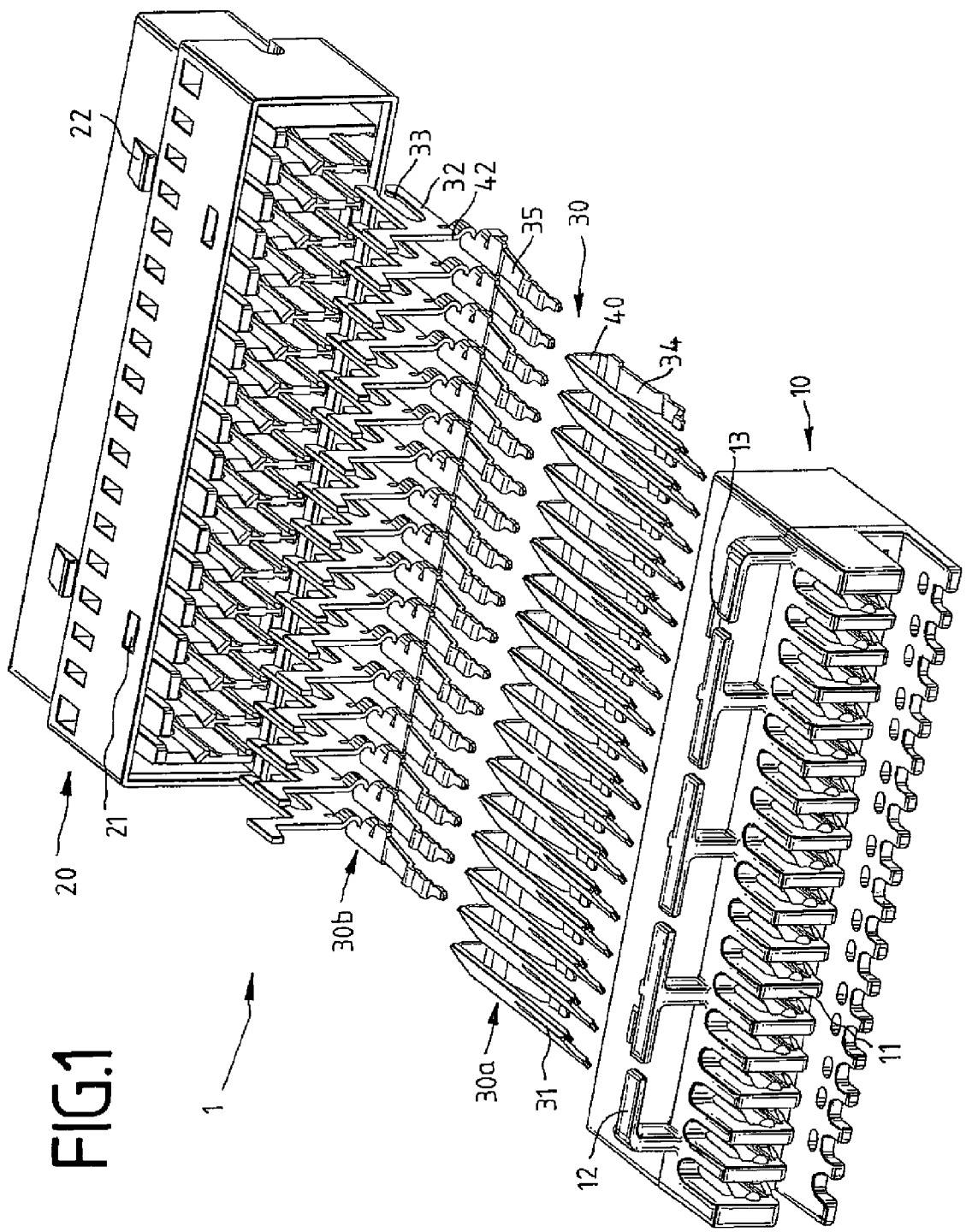
FIG. 1 shows a perspective exploded view of a plug connector for printed circuit boards.

FIG. 1 shows a perspective view of the plug connector 1. The plug connector 1 comprises a first housing portion 10, a second housing portion 20 and a multiplicity of contact elements 30. The contact element 30 respectively comprises a first portion 30a and a second portion 30b. The first housing portion 10 is produced with clamping bars 11, wire routing eyes 12 and latching lugs 13. The second housing portion 20 is produced with latching receptacles 21 and latching lugs 22. In addition, that portion of the second housing portion 20 which faces the printed circuit board forms a chamber-like region whose inner sides have ribs 23 arranged on them at the top and bottom, which can be seen in part in FIG. 3, with the ribs 23 being beveled in the front region. The bevel allows the plug connector to be pushed onto the printed circuit board 70 more easily (see FIG. 4). The contact elements 30 respectively have an insulation displacement contact 31 and a tuning fork contact 32, with the insulation displacement contact 31 and the tuning fork contact 32 being twisted through approximately 45° with respect to one another. In this arrangement, the insulation displacement contact 31 is associated with the first portion 30a of the contact element 30, and the tuning fork contact 32 is associated with the second portion 30b of the contact element 30. The tuning fork contact respectively has two rounded, inwardly curved contact regions 33. The insulation displacement contacts 31 on the contact elements 30 are plugged into receptacles between the clamping bars 11, the latter being mechanically fixed. Arranged on the insulation displacement contact 31 is a first contact limb 34, which extends from the lower edge 40 of the insulation displacement contact 31 in an upward curve in the direction of the insulation displacement contact 31. Similarly, a second contact limb 35 extends from the lower edge 42 of the tuning fork contact 32, but this second contact limb runs in the opposite direction. The two contact limbs 34, 35 together form an isolating contact 36, which is shown in FIG. 2a. For the purposes of assembly, the tuning fork contacts 32 are pushed into the second housing portion 20. In addition, the insulation displacement contacts 31 are pushed into the first housing portion 10, with the contact limb 34 entering a second lateral cavity in the first housing portion 10 in the process. Next, the second housing portion 20 is latched onto the first housing portion 10, with the latching lugs 13 engaging in the latching receptacles 21. In this case, the contact limb 35 likewise enters the cavity and forms the isolating contact 36 together with the contact limb 34.

This assembled state is shown in FIGS. 2a, b and 3. In this case, FIG. 2a shows a cross section through the plug connector 1, the interface being situated between two clamping bars. In this arrangement, the two contact limbs 34, 35, which are in resilient contact with one another, form an isolating contact 36. This isolating contact 36 has an insertion region 37 and a contact region 38. In this case, it can be seen that the two contact limbs 34, 35 touch in the contact region 38 and form an electrical contact. As a result, the insulation displacement contact 31 is electrically connected to its associated tuning fork contact 32. The first housing portion 10 has an insertion opening 14 for a plug connector (not shown) which can be inserted into the insertion region 37 of the isolating contact 36. This bends the two contact limbs 34, 35 apart and breaks the electrical contact between the insulation displacement contact 31 and the tuning fork contact 32. In this arrangement, the isolating connector is of such a length that it does not touch the contact limbs 34, 35 in the contact region 38. This prevents wear on the isolating connector from impairing the contact in the contact region 38. Situated between the two lower regions of the insulation displacement contact 31 and of the tuning fork contact 32 is a slotted clamping bar on which the lower edge 40 of the insulation displacement contact 31 is supported, the tuning fork contact 32 being situated in the slot (FIG. 2b). As can be seen, the tuning fork contact 32 rests on the second housing portion 20 and is clamped from above by the first housing portion 10 (FIG. 2a). Between the lower edge 40 of the insulation displacement contact 31 and the tuning fork contact 32 is an air gap 41, so that the electrical contact between the two is made exclusively via the contact region 38.

Figure 4:
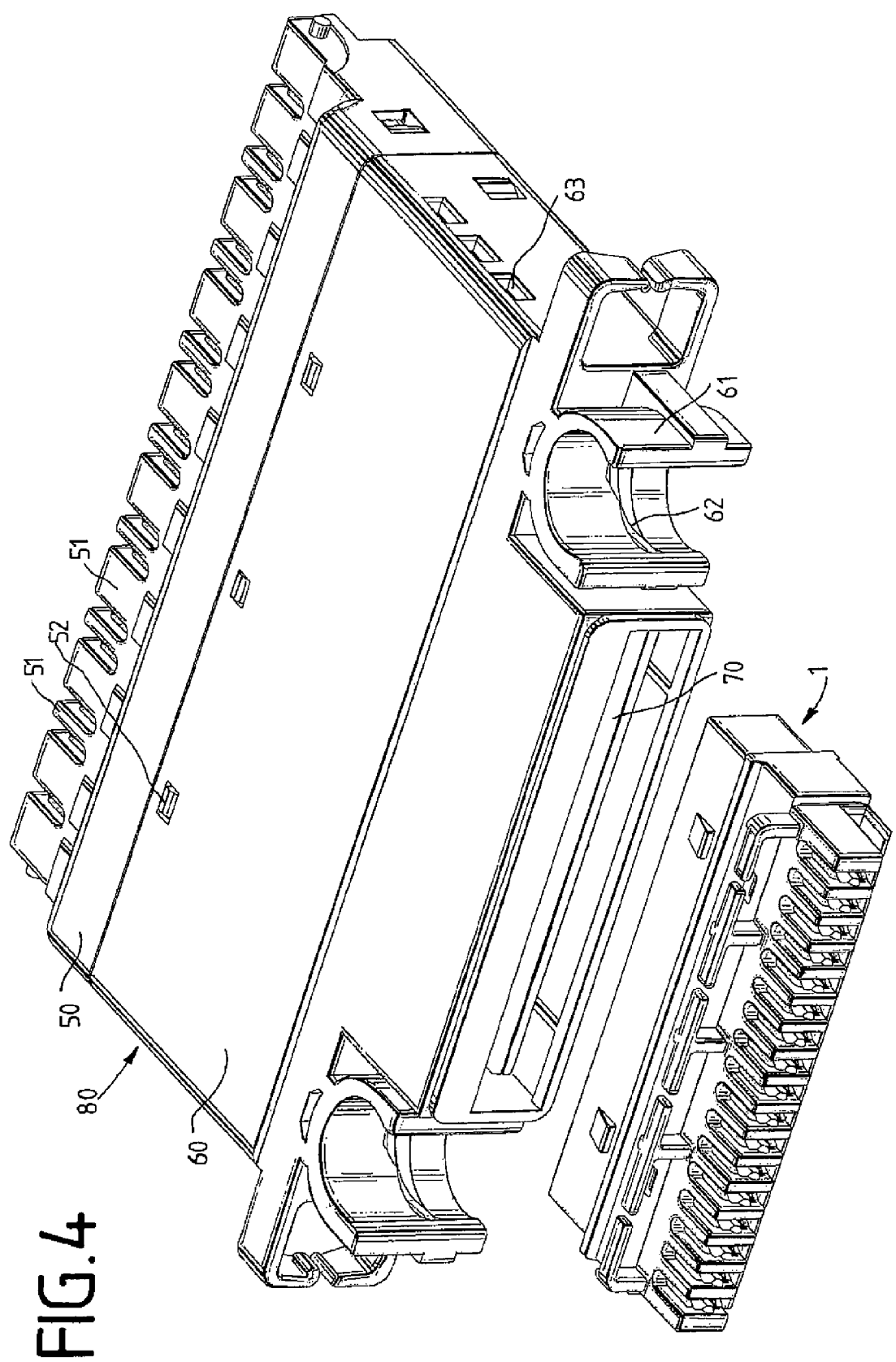
FIG. 4 shows a perspective exploded view of a distributor connection module.

FIG. 4 shows a perspective view of a distributor connection module 80 for telecommunications and data technology with the inventive plug connector 1. The distributor connection module 80 likewise comprises a first housing portion 50 and a second housing portion 60 which can be latched to one another. The distributor connection module 80 contains a printed circuit board 70. The second housing portion 60 is produced with two semicircular clamping elements 61 which can be used to latch the distributor connection module 80 onto rods (not shown). For the purpose of passing through a ground connection, the clamping elements 61 are slotted, so that an annular ground contact, which is arranged on the printed circuit board 70, projects through the slots 62 and makes electrical contact with the metal rods. The first housing portion 50 comprises clamping bars 51 and latching lugs 52 which engage in latching receptacles in the second housing portion 60. In this arrangement, the clamping bars 51 are of different width, which means that the crosstalk between contact pairs is reduced. Arranged between the clamping bars 51 are contact elements (likewise not shown) which are in the form of insulation displacement contacts in the region of the clampings bars 51 and in the form of tuning fork contacts toward the printed circuit board 70. Normally, these contact elements are identical to the contact elements 30 in this case. If, by contrast, no isolating contact is required, then the insulation displacement contacts and the tuning fork contact may be of integral design. In principle, the housing portion 50 may be similar to the plug connector 1 in this case. On the side walls, the second housing portion 60 has ventilation slots 63 produced in it, in order to dissipate the heat lost from the components on the printed circuit board 70.

Finally, FIG. 5 shows the entire distributor connection module 80 with the plug connector 1 latched in.

LIST OF REFERENCE NUMERALS

1 Plug connector
10 Housing portion
11 Clamping bars
12 Wire routing eyes
13 Latching lugs
14 Insertion opening
20 Housing portion
21 Latching receptacles
22 Latching lugs
23 Ribs
30 Contact elements
31 Insulation displacement contact
32 Tuning fork contact
33 Contact regions
34 Contact limb
35 Contact limb
36 Isolating contact
37 Insertion region
38 Contact region
39 Clamping bar
40 Lower edge
41 Air gap
42 Lower edge
50 Housing portion
51 Clamping bars
52 Latching lugs
60 Housing portion
61 Clamping elements
62 Slots
63 Ventilation slots
70 Printed circuit board
80 Distributor connection module

The invention claimed is:

1. A plug connector for printed circuit boards, comprising:
a plurality of contact elements each having a first end, a second end, and an intermediate contact positioned between the first and second ends, each first end forming an insulation displacement contact defining a planar surface, each intermediate contact being laterally aligned with at least a portion of the planar surface of the respective insulation displacement contact, each contact element including an abutment portion that extends laterally relative to the planar surface of the insulation displacement contact, the abutment portion being spaced from the insulation displacement contact; and
a housing defining a plurality of passages in which the contact elements are positioned, the housing defining a plurality of shoulders, each shoulder laterally extending into one of the passages to support the abutment portion of the respective contact element against a connection force resulting from pressing a wire into the insulation displacement contact.

2. The plug connector of claim 1, wherein the housing includes a first housing part and a second housing part that is configured to latch to the first housing part, each housing part defining slots that align to form the passages, the slots of the first housing part receiving the insulation displacement contacts, the shoulders extending into the slots of the second housing part.

3. The plug connector of claim 2, wherein the second end of each contact element extends into the slots of the second housing part.

4. The plug connector of claim 1, wherein the housing is formed from plastic.

5. The plug connector of claim 1, wherein the housing is configured to mount to a printed circuit board.

6. The plug connector of claim 1, wherein the housing includes two major sides and two minor sides extending between the major sides.

7. The plug connector of claim 6, wherein the insulation displacement contact of each contact element is arranged so as to be twisted about 45° relative to the major sides of the housing.

8. The plug connector of claim 6, wherein the housing is produced with wire routing eyes.

9. The plug connector of claim 8, wherein at least one wire routing eye is provided at one of the major sides of the housing.

10. The plug connector of claim 6, wherein latch elements are arranged at an outer side of the housing, the latch elements being configured to latch the plug connector to a further housing which accommodates a printed circuit board.

11. The plug connector of claim 1, wherein each of the contact elements includes a first piece and a second piece, the first piece including the first end of the contact element and the second piece including the second end of the contact element.

12. The plug connector of claim 11, wherein the intermediate contact is formed by a first limb of the first piece and a second limb of the second piece.

13. The plug connector of claim 1, wherein the second end of each contact element is configured to receive a printed circuit board.

* * * * *